United States Patent
Lehoczky

Patent Number: 5,798,572
Date of Patent: Aug. 25, 1998

[54] UNDER WATER HYDRO-TURBINE ENERGY GENERATOR DESIGN

[76] Inventor: Kalman N. Lehoczky, 6156 9th Ave. Cir. NE., Bradenton, Fla. 34202

[21] Appl. No.: 632,668

[22] Filed: Apr. 15, 1996

[51] Int. Cl.⁶ ..................................................... F03B 13/10
[52] U.S. Cl. .............................. 290/54; 290/43; 60/506
[58] Field of Search ................................ 290/54, 52, 43; 415/3.1, 4.1, 906, 168.1, 168.2, 168.4, 122.1, 124.1, 124.2

[56] References Cited

U.S. PATENT DOCUMENTS

| | | | |
|---|---|---|---|
| 4,026,587 | 5/1977 | Hultman et al. | 290/53 |
| 4,380,416 | 4/1983 | Menager | 415/174.3 |
| 4,613,279 | 9/1986 | Corren et al. | 415/121.2 |
| 4,946,410 | 8/1990 | Haman | 440/83 |
| 5,080,126 | 1/1992 | De Rycke et al. | 137/209 |
| 5,100,290 | 3/1992 | Berger | 415/60 |
| 5,174,719 | 12/1992 | Walsh et al. | 416/142 |
| 5,494,466 | 2/1996 | Vernea | 440/75 |

Primary Examiner—Steven L. Stephan
Assistant Examiner—Nicholas Ponomarenko

[57] ABSTRACT

Hydro-turbine driven electrical generating unit, contained in a water tight bulb housing and submerged in a water current, is comprised of a rigid frame supporting a rotating system, consisting of a combination of turbine runner, turbine shaft, turbine shaft seal, bearings, speed-increasing transmission, generator, and couplings, and a central terminal block for the connection of power, measuring and control cables and tubes. The generating unit can be tested, adjusted and maintained outside of the bulb housing and the generating unit can be lifted and installed into or removed from the bulb housing. The bulb housing contains small side wall openings corresponding with the connection points between the generating unit and the bulb housing.

7 Claims, 2 Drawing Sheets

Section I - I

Detail A

Detail B

5,798,572

UNDER WATER HYDRO-TURBINE ENERGY GENERATOR DESIGN

BACKGROUND OF THE INVENTION

1. Field of the Invention

The present invention relates to hydro-turbine driven electrical generating units submerged in rivers, ocean currents and especially those which convert the kinetic energy of the water flow into electrical energy. Typically, these units consist of a bulb housing and a rotating system consisting of turbine runner, several shafts, turbine shaft seal, bearings, speed increasing transmission, electrical generator and shaft couplings. The additional auxiliary equipment provides for removal of leakage water, measurement and control actions.

2. Description of the Prior Art

The problem with this type of equipment is the conflicting interests with respect to the structural strength and the convenience of assembly and dismantling procedures. The bulb housing is exposed to a variety of large torque, bending and hydraulic forces and is typically designed as a cylindrical container. The cross section of the bulb housing, perpendicular to the water flow, must be kept small with regard to the turbine's hydraulic efficiency. Therefore, the cross section is only slightly larger than the largest component of the rotating system. Components of the rotating system must be anchored firmly relative to the bulb housing to ensure an exact and permanent alignment of the shaft line through all rotating components and in order to transfer the significant bearing, torque and hydraulic forces to the bulb housing. Therefore, the bulb housing is equipped with strong bearing plates, support ribs and brackets onto which components of the rotating system can be bolted. These support elements must be accurate in order to facilitate alignment of the rotating system. The installation procedure is difficult and time consuming. Typically, all major components, bearings, shafts, transmission, electrical generator and couplings are moved in one-by-one axially from the open axial end of the bulb housing. The narrow radial space between the bulb housing and the generating unit makes it inevitable that the bulb housing must be equipped with several radial openings to provide access to shaft couplings, support brackets, electrical connections, etc. These openings must be large in order to provide ample working room and freedom for the operation of tooling. The opening required may be 60% of the bulb housing's width or diameter. The large openings weaken the structural strength and the installation and dismantling procedure still remains difficult. Each of these openings must be covered with a completely water tight flange and cover plate system. The fully equipped and covered access openings may be monstrous outcroppings on the external surface of the bulb housing causing severe interference with the water flow and a reduction of the turbine's efficiency.

SUMMARY OF THE INVENTION

The invention relates to a hydro-turbine driven electrical generating unit, contained in a water tight bulb housing and submerged in a water current, comprised of a rigid frame supporting a rotating system, consisting of a combination of turbine runner, turbine shaft, turbine shaft seal, bearings, speed-increasing transmission, generator, and couplings, and a central terminal block for the connection of power, measuring and control cables and tubes. The generating unit can be tested, adjusted and maintained outside of the bulb housing and the generating unit can be lifted and installed into or removed from the bulb housing.

BRIEF DESCRIPTION OF THE DRAWINGS

FIG. 1 includes a cross-section marked I—I which is perpendicular to the rotational axis of the generating unit. Detail A shows the components for removal of leakage water. Detail B shows the flexible connection between the the rotating system system installed on the frame and the bulb housing.

DESCRIPTION OF THE PREFERRED EMBODIMENTS

The object of the present invention is to provide a design for hydro-turbine driven electrical generating units, contained in a bulb housing and submerged in water currents, in which the design makes it possible to assemble, test, adjust and maintain the generating unit outside and independently from the bulb housing and lift, install and remove the generating unit and its auxiliaries into and out of the bulb housing. By doing this, the size of side openings in the bulb housing can be minimized to serve only the interconnection between the generating unit and the bulb housing. The small side openings ensure the maximum possible strength and rigidity, minimize the turbulence in the water flow, increase the turbine's hydraulic performance.

Figure 1:
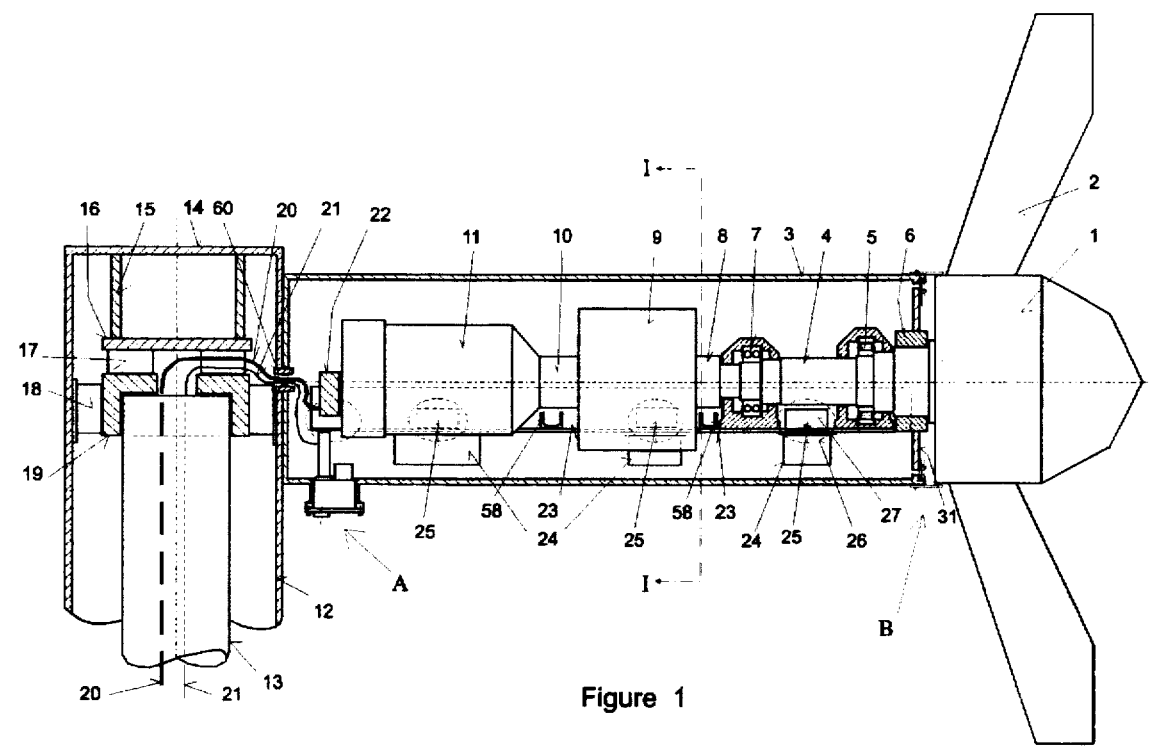
FIG. 1 - Longitudinal cross section of hydro-turbine driven electrical generating with the rotating system installed on a rigid frame and the surrounding bulb housing.
Figure 1A:
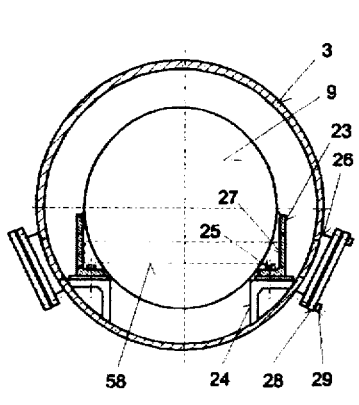
Figure 1B:
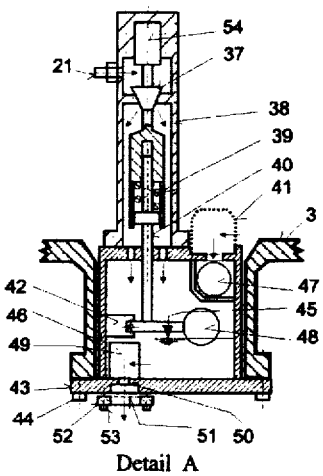
Figure 1C:
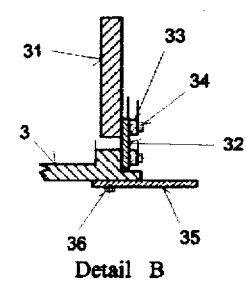

FIG. 1 shows a possible application of the invention on a hydro-turbine generating unit where the turbine runner, consisting of hub 1 and blades 2, is arranged on the down-stream end of the bulb housing 3. The bulb housing is a large diameter steel tube. The rigid frame 23 is composed of two longitudinal steel beams with L-section. Only two of their transversal interconnections 58 are shown. The horizontal leg of the longitudinal beam is equipped with six holes to accommodate the removable fasteners, in this case the anchoring bolts 25. In line with the bolt holes, windows 27 are arranged through the vertical leg of the longitudinal beams to provide access to the bolts. In line with the six bolts 25 and the six windows 27, there are six small round openings 26 through the wall of the bulb housing. The sole purpose of these windows 27 and openings 26 is to access the bolts 25, in order to introduce, manipulate, and remove the tools required to connect and disconnect the rigid frame 23 from the bulb housing 3. In order to provide a water-tight locking of these openings, short flanged tubes are welded to the bulb housing. The openings are equipped with cover plates 28 and bolts 29. Removing the cover plates 28, the bolts 25 can be directly accessed.

In line with the bolts, under the rigid frame 23, six support surfaces 24 formed as brackets are welded to the internal surface of the bulb housing 3. The brackets are equipped with tapped holes for accommodating the bolts 25. The exact positioning of these brackets is achieved by bolting the brackets to the finished rigid frame, which is equipped with connection points corresponding with the support surfaces 24. Thereafter, the frame is brought inside of the bulb housing and into a designed position which is aligned exactly parallel with the center line of the bulb housing. Accomplished this, the brackets, creating the connection surfaces 24, are tack-welded to the bulb housing. Thereafter, the bolts 25 can be removed and the rigid frame can be taken out of the bulb housing for installation of the rotating system on the rigid frame 23.

The two longitudinal beams, creating the rigid frame 23, are interconnected at the turbine end by a perpendicular plate 31, which in this case is shaped like a circular disk. The purpose of this plate is to close the bulb housing's axial end. Inevitable inaccuracies can be expected between the end of the bulb housing and the center line of the rotating equipment, therefore a flexible and adjustable ribbon 32 in this case a ring made of rubber, creates the transition between the plate and the bulb housing. Two steel rings 33 are pressing the rubber ring against the plate and the bulb housing. The sealing pressure is introduced by a large number of bolts 34. There is a circumferential gap between the bulb housing and the turbine hub. This gap is covered by a cylindrical steel ring 35 bolted 36 to the bulb housing. The internal hub of the plate 31 carries the turbine shaft seal 6. If the cross section of the bulb housing is not circular, the circular plate 31 must be replaced by a plate whose periphery matches the shape of the bulb housing. The invention is not limited by the type of shaft seal 6.

The application example shown is based on the assumption that the rotating system consists of turbine runner 1 & 2, shaft seal 6, two turbine shaft bearings 5 & 7, shaft coupling 8, speed increasing transmission 9, shaft coupling 10, and generator 11. There are several shafts in the system: a turbine shaft, in-going and out-going transmission shafts, and a generator shaft. The speed increasing transmission shown is an "in-line" gear, in which the in- and out-going shafts have the same center line and the gear housing is symmetrical relative to the same center line providing a space efficient adaptation to the cylindrical bulb housing. The arrangement in accordance with FIG. 1 assumes that the inside of the bulb housing is filled with air and the level of leakage water can be kept under the electrical generator and electrical components.

Figure 2:
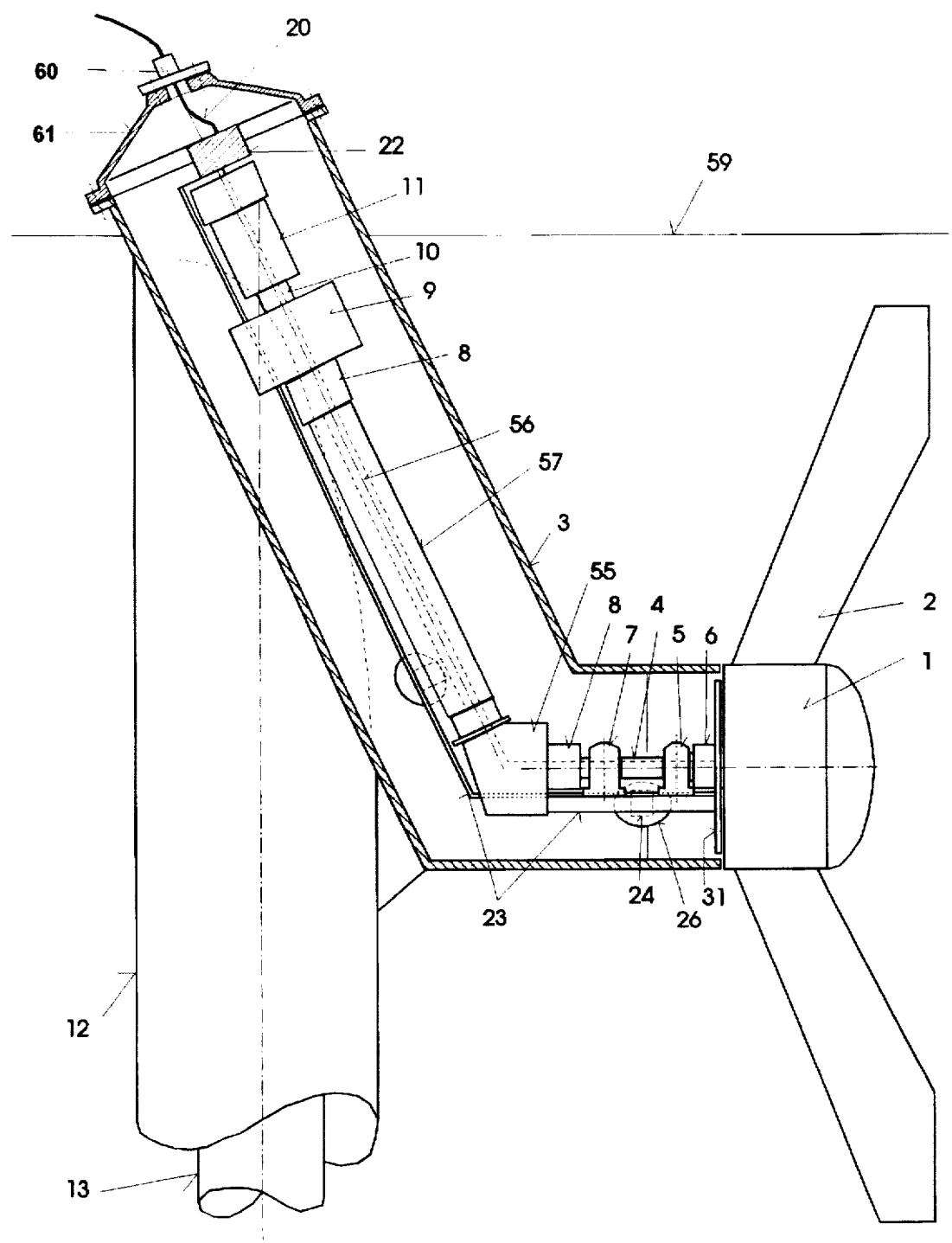
FIG. 2 - Longitudinal cross section of hydro-turbine driven generating unit with an angled transmission.

The invention covers various applications with a possible example shown in FIG. 2. FIG. 2 contains essentially the same components and symbols as FIG. 1. However, the difference is that a "lower" transmission 55 is applied in-line with the turbine shaft and with an outgoing shaft oriented upward at a convenient angle, assuming that the generator 11 is positioned close to or above the water surface 59. In this case, the bulb housing 3 would be extended upward following the new intermediate shaft 56 and equipped with the required side wall openings 26 and support surfaces 24 supporting the rigid frame 23, carrying the transmissions, generators, etc. This arrangement would bring all of the electrical systems close to or above the water surface 59 and safely above the leakage water level inside of the bulb. The bulb housing 3 is closed at the top by a removable lock 61 containing the water tight cable bushing 60 for the cables 20. This arrangement facilitates the inspection of the generating unit from above the water surface 59.

The solution shown in FIG. 2 contains two speed increasing transmissions, a "lower" 55 attached to the turbine shaft and an "upper" speed increaser 9. The "lower" transmission may be primarily designed for change of the shaft angle and with a relative low speed increment and the "upper" transmission may take care of the remaining speed increment up to the required generator speed. The choice of speed increments in the two transmissions is a matter of technical and economical optimization under consideration of critical speed. In accordance with the invention, the two transmissions may be interconnected with an oil tight tube 57, containing the intermediate shaft 56 and shaft couplings at both ends. The tube communicates the lubricating oil between the two transmissions and provides a positive internal pressure in the lower transmission 55 above the hydrostatic pressure of the accumulated leakage water. This arrangement would also permit complete or partial elimination of the turbine shaft seal 6 and the turbine shaft bearings 5 & 7 may be converted into water lubricated bearings. In this case the lower end of the bulb housing would be regularly filled with the leakage water. The oil pressure inside of the "lower" transmission 55 can be close to or higher than the leakage water pressure outside of the lower transmission, causing that the oil seal at the in-going shaft of the transmission will be able to keep out the leakage water.

In order to be able to install and remove the rigid frame 23 with the assembled rotating system through the upper end of the bulb housing, the plate 31 may be required to be removed from the rigid frame 23 and the turbine runner 1 & 2 must be removed from the turbine shaft 4.

The type of generator; Direct Current, Asynchronous, Synchronous with or without brushes, Hydraulic, Pneumatic, etc., does not limit the application of the invention. Furthermore, the general arrangement of the external hydraulic system such as type of turbine, turbine controls, water flow direction, bearings, shaft couplings and shaft seal, or the general arrangement with respect to the support of bulb housing by a rotating housing, piling, or other stationary or floating structures, the method of transferring energy, measurement and control data between the rotating system to and from the external sources does not create a limitation for this invention.

Bringing the electrical generator to an elevated location in the bulb housing, in accordance with FIG. 2, cannot be regarded as an universal solution. Therefore, a method for the treatment of water leakage shall be applied. A possible arrangement is shown in FIG. 1, Detail A. Practically no leakage water is expected to enter at the cover plates and other stationary contact surfaces. The main source of leakage is the turbine shaft seal 6. Practically all types of shaft seals work with a certain leakage. The water leakage between the contact surfaces in the seal may be required both as a lubricant and as a cooling medium. Therefore, a constant pressurizing of the bulb interior and prevention of any water leakage through the shaft seal may dry out the seal's contact surfaces, accelerating the wear and damage.

In accordance with the invention, the pressurization shall be intermittent with the sole purpose of removing the accumulated leakage water from the bulb housing. FIG. 1, "detail A", shows the possible configuration of the leakage water removal system. The bulb housing's 3 lowest point is equipped with a flanged opening. Into the opening is inserted a device consisting of a mounting flange 43, screws 44, a valve housing 46, and a compressed air valve housing 38. The device is connected to tubing 21 which provides the compressed air required for operation of the device. The pressure of the compressed air is higher than the pressure of the water on the outside of the bulb.

The leakage water in the bulb housing 3 enters the valve housing 46 through the filter 41. The water level in the valve housing is marked 45. If the water level increases, a float 48 with large buoyancy and the push rod 4Q are lifted. As the water level 45 rises, the push rod more and more compresses a helical spring 39, since the needle-valve 37 exposed to the compressed air from above cannot move upward. When the water level and the spring compression reaches a certain level, the needle valve suddenly opens and the compressed air blows down into the valve housing 46. The air stream lifts the valve body 47 and closes the entrance to the bulb housing 3, preventing a pressure increase in the bulb housing. The pressure in the valve housing can now increase until the check valve 49 opens and the accumulated water will be pushed out through the opening 50 and filter 51 into the external water. As the water level 45 drops, the float 48 sinks, permitting the needle valve 37 to close again. The valve body 47 will now drop opening the path for the leakage water.

The earlier mentioned check valve 49 prevents the entering of water from the surroundings. A filter 51 protects the valve 49. Bolts 52 and support ring 53 provide an easy removability, cleaning and replacement of the filter.

In accordance with the invention, the needle valve 37 can be equipped with an electromagnetic activator 54 completing the operation governed by the balance of float 48, pressure and gravity. The magnetic activator can be switched on manually or by a magnetic switch 42 sensing the water leakage level 45.

There is a central terminal block unit 22 on the rigid frame to which all electrical power cables from the generator and measuring and control cables can be connected before the frame is installed inside of the bulb housing.

The generating unit consisting of the complete rotating system, the central terminal block 22, and the rigid frame 23 can be operated, tested, adjusted on a test stand under full visual and manual access to all components. When the generating unit is installed inside of the bulb housing 3, the external cables 20 can simply be plugged into or screwed to the central terminal block 22. At the same time also, the air hose 21 can be connected to the leakage water removal unit. In order to facilitate this operation, the bulb housing may be equipped with two access holes, similar to those six holes 26 used to access the bolts 25. These openings will also be sealed with bolted on cover plates.

FIG. 1 shows an arrangement where the bulb housing 3 is rigidly connected to a rotating housing 12, which makes it possible for the bulb housing and the turbine to swing around a vertical pole 13. The moving freedom ensures that the turbine can automatically turn into the downstream direction of the water flow. The rotating housing's top plate 14 is equipped with a support structure consisting of a steel cylinder 15 and a support plate 16. The thrust bearing pads 17 are bolted to the support plate 16. The pads may be self lubricated or adapted to operation underwater. The upper surface of the thrust bearing collar 19, installed on the pole 13, serves as the sliding surface for the thrust bearing pads. The side surface of the thrust bearing collar creates the sliding surface for the guide bearing pads 18, which are bolted to the inside of the rotating housing 12. The electric cables 20 and the compressed air tubing 21 are passing through the wall between the bulb housing and the rotating housing throughout air and water tight bushings 60. The electric cables 20 and the compressed air tubing 21 are suspended inside of the pole 13, providing a connection to the bottom of the water channel and from there to an over-surface location where the possible electrical conversion and distribution, measurement instruments, controls, protective relays, air compressor, etc. are installed.

What is claimed is:

1. Hydro-turbine driven electrical generating unit, contained in a water tight bulb housing and submerged in a water current, is comprised of a rigid frame supporting a rotating system, consisting of a combination of turbine runner, turbine shaft, turbine shaft seal, bearings, speed-increasing transmission, generator, and couplings, and a central terminal block for the connection of power, measuring and control cables and tubes, and the bulb housing is internally equipped with support surfaces corresponding with connection points on the generating unit where the connection between the support surfaces and the connection points is provided by removable fasteners.

2. Hydro-turbine driven electrical generating unit in accordance with claim 1, where the rigid frame is equipped with a plate perpendicular to the turbine shaft and in which the internal hub of the plate carries a turbine shaft seal and a flexible and adjustable ribbon is mounted on an external periphery of the plate and on the bulb housing respectively creating a water tight closing of the gap between the plate and the bulb housing.

3. Hydro-turbine driven electrical generating unit in accordance with claim 1, equipped with a transmission with an in-going shaft in-line with the turbine shaft and with an out-going shaft which is angled to point in the direction of the water surface, and an intermediate shaft connecting the outgoing shaft with the electrical generator located close to the water surface, safely above the leakage water accumulated in the bulb housing.

4. Hydro-turbine driven electrical generating unit in accordance with claim 3, equipped with an upper speed-increasing transmission connecting the upper end of the intermediate shaft and the generator.

5. Hydro-turbine driven electrical generating unit in accordance with claim 3, equipped with an oil tight enclosure around an intermediate shaft, in which the enclosure has an oil tight connection to the lower transmission and where the turbine shaft seal is not completely watertight permitting the leakage water to enter into and accumulate inside of the bulb housing.

6. Hydro-turbine driven electrical generating unit in accordance with claim 1, equipped with a compressed air operated leakage water removal device which is automatically activated when the water level inside of the bulb reaches a certain level and automatically maintains a pressure level inside of the bulb which is slightly lower than the hydrostatic pressure outside of the bulb.

7. Hydro-turbine driven electrical generating unit in accordance with claim 1, equipped with small openings through the wall of the bulb housing, corresponding with bolts connecting the rigid frame and the bulb housing, and the dimensions of the small openings is chosen to permit the introduction, manipulation and removal of the tools required for connecting and disconnecting the rigid frame and the bulb housing.

* * * * *